United States Patent Office 3,632,634
Patented Jan. 4, 1972

---

3,632,634
PHOSPHORUS COMPOUNDS HAVING THE SKELETON STRUCTURE
P—[C—P]₂ or P—[C—P]₃
 |        |
 (C)ₙ     (C)ₙ

Ludwig Maier, Tiergartenstrasse 17, Kilchberg, Zurich, Switzerland
No Drawing. Filed Aug. 16, 1968, Ser. No. 753,056
Int. Cl. C07f 9/30, 9/50
U.S. Cl. 260—502.4 P                    1 Claim

---

ABSTRACT OF THE DISCLOSURE

Phosphorus compounds having the skeleton structure

P—[C—P]₂ or P—[C—P]₃
 |        |
 (C)ₙ     (C)ₙ of the formula $$P(O)_a(R^1)_b[\underset{R^4}{C}HP(O)(R^2)R^3]_{3-b}$$

where $a$ and $b$ are 0 or 1, and process for making by reacting a compound of the formula $$P(O)_a(R^1)_b[\underset{M'}{C}HP(O)(R^2)R^3]_{3-b}$$

with an organic halide of the formula $R^4X$. The present compounds are useful as complexing agents, surfactants, plasticizers, hydraulic fluids, corrosion inhibitors, stabilizers for peroxides and hydroperoxides, additives to electrolytic baths, heat transfer agents, lubricants, oil additives, and gasoline additives to detergents.

---

This invention relates to phosphorus compounds containing the atomic skeleton

P—C—P]₂ or P—[C—P]₃
 |        |
 (C)ₙ     (C)ₙ and to a process for preparing phosphorus compounds containing the atomic skeleton P—[C—P]₂ or P—[C—P]₃
 |        |
 (C)ₙ     (C)ₙ and corresponding to the general formula (I)    $P(O)_a(R^1)_b\left[\underset{}{\overset{R^4}{C}}HP(O)(R^2)R^3\right]_{3-b}$ in which $R^1$, $R^2$, $R^3$ and $R^4$ signify possibly substituted and/or ethylenically or acetylenically unsaturated hydrocarbon groups or heterocyclic groups linked via a carbon atom, $R^1$, $R^2$ and $R^3$ moreover also can be RO groups where R is the residue of a hydroxyl compound, HO groups, MO groups were M is a metal atom, ammonium or substituted ammonium, $a$ represents 0 or 1 and $b$ 0 or 1.

The process is characterized in that an alkali metal compound of the general formula II    $P(O)_a(R^1)_b\left[\underset{M'}{C}HP(C)(R^2)R^3\right]_{3-b}$ in which the symbols have the same significance as above, except that no HO groups or MO groups can be present, and M' represents an alkali metal atom, is reacted with an organic halide of the general formula (III)           $R^4X$ in which $R^4$ has the same significance as above and X represents a reactive halogen atom, i.e. a chlorine, bromine or iodine atom, attached to a carbon atom, and the ester groups present in the product formed can be converted to the corresponding acid groups in known manner, and the acid groups can be converted to the metal salts, ammonium salts or substituted ammonium salts in known manner.

Attempts for preparing the starting materials having the atom skeleton P—(C—P)₂ by reacting di-chloromethylphosphinic acid ester of the formula $(RO)(O)P(CH_2Cl)_2$ with sodium diethylphosphite of the formula $$NaP(O)(OC_2H_5)_2$$

have been unsuccessful up to now [U.S. Air Force Technical Report, Contract AF 33 (616)–6950 (1960)]. Other indications dealing with the preparation of phosphorus compounds showing the atom backbone P—(C—P)₂ or P—(C—P)₃ and possessing at least one RO group, HO group or MO group attached to a phosphorus atom are not found in the technical prior art.

The starting compounds to be used herein can now be prepared according to a patent of the same inventor and same applicant, copending application Ser. No. 690,418, filed Dec. 14, 1967. It has been found that even all methylene groups present between the phosphorus atoms can receive substituents. This total substitution can be expressed by the following equation:

(1) $P(O)_a(R^1)_b\left[\underset{M'}{C}HP(O)(R^2)R^3\right]_{3-b} + {}_{3-b}R^4X \longrightarrow$ $P(O)_a(R^1)_b\left[\underset{}{\overset{R^4}{C}}HP(O)(R^2)R^3\right]_{3-b} + {}_{3-b}M'X$ If less than the two or three methylene groups always present should receive a substituent, the amount of organic halide to be reacted is correspondingly decreased.

As compared with the well known substituted methylene-bis-phosphonic acids and their esters and salts, the compounds of invention possess at least a grouping

P—C—P—C—P and may contain up to six ester groups or acid groups attached to the phosphorus atoms. Because of this, they are superior with respect to their properties and possible uses. If they bear similar groups the novel esters, for example, show generally higher boiling points and to the extent that they are liquids, also a broader liquid range. The complexing power, the emulsifying or dispersing ability and the thermal resistance are better as compared with the well-known compounds. Therefore, they are better suited for uses such as complexing agents, surfactants, plasticizers, hydraulic fluids, corrosion inhibitors, stabilizers for peroxides and hydroperoxides, additives to electrolytic baths, heat transfer agents, lubricants, oil additives, gasoline additives to detergents, and they provide technical advantages.

Some of the compounds of invention having ester groups are soluble in water as long as the organic groups do not possess more than three carbon atoms. The acids formed by hydrolysis of the ester groups can be used in aqueous solution in the form of salts, e.g. sodium salts, potassium salts, ammonium salts and substituted ammonium salts. They can form soluble complexes with certain metals such as calcium, magnesium, iron, copper, lead, silver, uranium. However, such complexes are also formed by the compounds of invention containing two or more ester groups instead of hydroxyl groups. In general, the complexing power increases with the number of ester groups or hydroxyl groups.

The novel phosphine oxides, e.g. tris - (O,O' - diethylphosphonylpropylidene)-phosphonoxide and bis-(O,O'-dimethylphosphonylethylidene)-methylphosphine oxide, display an unusual absorption capacity in that they are able to bind a multiple of their weight of many solvents or organic liquids so strongly that a gel is formed similar to the solutions of certain polymers. Such phosphine oxides therefore are especially suited for the fixation of certain liquid compounds, e.g. essential oils and plasticizers.

The alkali metal compounds of Equation 1 can be prepared according to the indications of the above copending application by reacting a bis-chloromethyl-phosphorus compound like a bis-chloromethyl-phosphine such as bis-chloromethyl-phosphine,
bis-chloromethyl-ethylphosphine,
bis-chloromethyl-4-nitrilo-n-butylphosphine,
bis-chloromethyl-10-undecenylphosphine,
bis-chloromethyl-cyclopentylphosphine,
bis-chloromethyl-pentafluorocyclohexylphosphine,
bis-chloromethyl-benzylphosphine,
bis-chloromethyl-3-methoxyphenylphosphine and
bis-chloromethyl-4-dodecylphenylphosphine;

or like a bis-chloromethyl-phosphine oxide such as
bis-chloromethyl-allylphosphine oxide,
bis-chloromethyl-dodecylphosphine oxide,
bis-chloromethyl-cyclooctatrienylphosphine oxide,
bis-chloromethyl-4-tert-butylphenylphosphine oxide and
bis-chloromethyl-3-dimethylaminophenylphosphine oxide;

or like a bis-chloromethyl-phosphinic acid ester such as
bis-chloromethyl-phosphinic acid methylester and
bis-chloromethyl-phosphinic acid isopropylester;

or by reacting a tris-chloromethyl-phosphorus compound like tris-chloromethyl-phosphine or tris-chloromethyl-phosphine oxide with a phosphorous acid triester such as phosphorous acid triethylester,
phosphorous acid methylester-glycolester,
phosphorous acid methylester-diphenylester,
phosphorous acid dodecylester and
phosphorous acid ethylester-dodecylester-phenylester;

or with a phosphonous acid diester such as methylphosphonous acid di-isopropylester,
allylphosphonous acid ethylester-cyclohexylester,
4-chlorophenylphosphonous acid di-n-butylester and
2-decahydronaphthylphosphonous acid dmiethylester;

or with a phosphonous acid ester such as dodecyl-methylphosphinous acid methylester,
distyrylphosphinous acid n-propylester and
di-iso-butylphosphinous acid methylester at about 140 to 200° C. and subsequent metallation of the resulting compounds.

Any available phosphorus compound belonging to the above mentioned classes, of which only some examples have been enumerated in order to provide a better comprehension, may be considered as starting compounds utilizable herein. The number of well-known unsubstituted or substituted organic groups which can be attached to a phosphorus atom either directly or via an oxygen atom is already very large today.

The phosphorus compounds which first have to be converted to the corresponding alkali metal derivatives may be divided into the following classes:

tris-(O,O'-diorganophosphonylmethyl)-phosphines,
tris-(O,O'-diorganophosphonylmethyl)-phosphine oxides,
tris-(O-organo-organophosphinylmethyl)-phosphines,
tris-(O-organo-organophosphinylmethyl)-phosphine oxides,
tris-(oxo-diorganophosphinomethyl)-phosphines,
tris-(oxo-diorganophosphinomethyl)-phosphine oxides,
bis-(O,O'-diorganophosphonylmethyl)-phosphinic acid esters,
bis-(O-organo-organophosphinylmethyl)-phosphinic acid esters,
bis-(oxo-diorganophosphinomethyl)-phosphinic acid esters,
bis-(O,O'-diorganophosphonylmethyl)-organophosphines,
bis-(O,O'-diorganophosphonylmethyl)-organophosphine oxides,
bis-(O-organo-organophosphinylmethyl)-organophosphines,
bis-(O-organo-organophosphinylmethyl)-organophosphine oxides,
bis-(oxo-diorganophosphinomethyl)-organophosphines and
bis-(oxo-diorganophosphinomethyl)-organophosphine oxides.

The conversion to the corresponding alkali derivatives can be achieved in usual manner by treating with an alkali metal in an inert solvent such as toluene, ether, hexane and dioxane. The hydrogen atom of the methylene group displays sufficient acidity so that the alkali metals will be dissolved. However, other common processes such as the reaction with an alkali hydride or alkali amide may be employed.

The thus-formed alkali metal compounds are reacted with an organic halide according to the Equation 1.

The further reactants in the reaction of invention according to the Equation 1 are organic halides, e.g. alkyl halides, cycloalkyl halides, aralkyl halides, aryl halides, alkaryl halides and heterocyclic halides having at least one reactive halogen atom attached to a carbon atom, such as methyl iodide, n-heptylchloride, n-octylchloride, n-dodecylbromide and n-tetradecylbromide, cyclohexylchloride, chlorobenzene, benzylchloride, chlorotoluene, 2-, 3-, 4-chlorotoluene, 2-, 3- and 4-chloropyridine are utilizable.

The organic halides can be unsaturated such as 4-chlorobutene-1, vinylchloride and 3-chloro-2-methylbutene-1, 3-bromocyclohexene, styrylbromide and 1-allyl-4-bromobenzene. Moreover, the organic halides can bear substituents like chlorotrifluoroethylene, dibromocyclopentadiene, 1-chloro-4-bromo-benzene, 2-, 3-, 4-chlorobenzylchloride, dichloro-m-zylene, 3,4-dichlorotetrahydrofuran, 2-, 3-, 4-bromocyclohexanecarboxylic acid ethylester, 2-, 3-, 4-bromobenzoic acid methylester, 12-bromolauric acid ethyleter, 11-bromoundecylsulfonic ethylester, 2-, 3-, 4-chlorodimethylaniline, 2-, 3-, 4-chloroanisol, 2-, 4-chloronitrobenzene, 2-, 4-chlorobenzonitrile and 2-bromo-5-nitrofuran.

The enumerated examples will illustrate that as substituents halogen atoms, carboxylic ester groups, sulfonic ester groups, primary, secondary and tertiary amino groups, ether groups, nitro groups and cyano groups can occur. The long straight-chain alkylcarboxylic ester groups and alkylsulfonic acid ester groups having at least 7 carbon atoms and preferably 12 to 16 carbon atoms possess a particular significance, since these can be converted by hydrolysis to the corresponding acid groups and by neutralization to the corresponding water-soluble surface-active salts.

The temperature-resistant endproducts contain in the ester groups conveniently an aromatic group, e.g. phenyl group. The choice of the organic groups $R^1$ to $R^4$ is governed by the desired properties of the endproducts. In general, the starting compounds having lower alkylester groups are water-soluble and can be rendered insoluble by introducing a higher group $R^4$ into one or several of the methylene groups.

The reaction of the alkali salts with the organic halides is effected by heating in an inert solvent, e.g. toluene, until the separation of the alkali halide is complete.

As a rule, the same solvent is used as in the preparation of the alkali metal derivatives. The conversion of the esters to the acids is performed by simple heating with concentrated HCl or HBr. The free acids are less and less soluble in water with increasing carbon content of the substituents $R^4$. For example, the octyl and phenyl derivatives are scarcely soluble or insoluble in water. Water-soluble salts are obtained upon neutralizing with alkali hydroxides, alkali carbonates, ammonia and amines. The acids are employed as detergents or additives to detergent compositions preferably in the form of sodium salts. These acids can be up to hexabasic. After addition of e.g. NaCl, also in the pentabasic acids all acid groups are titratable.

It has been found that a particular advantageous method for preparing the acids is based on the thermal decomposition of the corresponding isopropyl esters. Propylene is split off quantitatively at about 180 to 200° C., leaving the acid in 100% yield.

EXAMPLE I

To a suspension of 1.4 g. of sodium in 50 ml. of toluene, prepared by high-speed stirring of molten sodium are added 10 g. (0.02 mole) of tris-(O,O-diethyl-phosphonylmethyl)-phosphine oxide. An exothermic reaction occurs with evolution of hydrogen. After final heating at 100° C. for 1 hour the released hydrogen amounts to 700 ml. (94%). Now, 11.6 g. (0.06 mole) of n-octylbromide are added, the mixture is refluxed for 3 hours and the solvent is evaporated. The residue is dissolved in water and freed of an oily impurity using light petroleum. By acidifying with HCl the ester-sodium-bromide complex is decomposed and the precipitated ester is filtered off.

Yield 8 g. of tris-(O,O'-diethyl-phosphonylnonylidene)-phosphine oxide of the formula

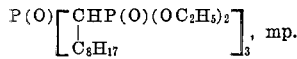

mp. 46–51° C. (from methyl alcohol).

In similar manner with undecylbromide, dodecylbromide, tetradecylbromide and phenylchloride the following compounds are obtained:

tris-(O,O'-diethyl-phosphonyldodecylidene)-phosphine oxide tris-(O,O'-diethyl-phosphonyltridecylidene)-phosphine oxide tris-(O,O'-diethyl-phosphonylpentadecylidene)-phosphine oxide and tris-(O,O'-diethyl-phosphonylbenzylidene)-phosphine oxide.

The surface tension of a compound of invention is compared with two compounds of the prior art by means of a Nuoy tensiometer in distilled water at 20° C.

| Compound | Surface tension (dyne/cm.) at the molar concentration indicated— | |
|---|---|---|
| | 5×10⁻² | 10⁻² |
| Tris-(O,O'-disodium-phosphonyl-tridecylidene)-phosphine oxide | 27.1 | 27.4 |
| Bs-(O,O'-disodium-phosphonyl)-tridecylidene | 32.6 | 28.4 |
| Sodium dodecylbenzenesulfonate | 40 | 40 |
| Water | 72 | 72 |

The calcium sequesting property of a compound of invention is compared with a compound of the prior art. A solution of 0.25 g. of the compound and 0.25 g. Na₂C₂O₄ in 250 ml. of distilled water is adjusted to a pH of 12 by means of NaOH. To this solution is added a 0.1 molar solution of Ca(NO₃)₂ until turbidity appears, i.e. until the precipitation of CaC₂O₄ is reached. In order to calculate the amount of calcium sequestered by 100 g. of the compound, the consumed ml. of Ca(NO₃)₂ solution is multiplied by the factor of 1.6.

Compound: G. Ca/100 g. of compound
Tris - (O,O' - disodium-phosphonyl-octylidene)-phosphine oxide _____ 5.6
Bis - (O,O'-disodium-phosphonyl)-octylidene __ 4.6

It is apparent that the compounds of invention in the form of alkali salts are excellently suited as additives to washing and cleaning compositions. Usual detergent compositions may contain about 5 to 50% of the new compounds of the invention, and other surfactants may be totally or partly replaced. The applied concentration is, in general, between about 0.05 to 1%. In dry-cleaning solutions the esters are used instead of the salts. In general, about 0.5 to 5% are dissolved in the organic solvent, e.g. perchloroethylene.

The ability of the compounds of invention to dissolve water in hexane is compared with two compounds of the prior art. The water is added dropwise to hexane until a stable turbidity or a phase separation is observed. A solution of 10 ml. of hexane and 5 ml. of compound is used.

Compound: H₂O addition, ml.
Tris - (O,O' - diethyl - phosphonyloctylidene)-phosphine oxide _____ 1.2
Bis - (O,O'-diethyl-phosphonyl)-octylidene ____ 0.5
Tris - (O,O'-diethyl - phosphonyltridecylidene)-phosphine oxide _____ 2.9
Bis - (O,O'-diethyl-phosphonyl)-tridecylidene __ 2.5

Consequently, the compounds are excellently suited as de-icer for gasoline. They are added in amounts of about 0.001 to 1% per weight.

EXAMPLE II

To a suspension of 1.9 g. (0.048 mole) of potassium in 80 ml. of toluene, prepared by high-speed stirring of molten potassium, are added 9.5 g. (0.024 mole) of bis-(O,O-diethyl-phosphonylmethyl) - phosphinic ethylester. After all the potassium is used up, 8 g. (0.057 mole) of methyl iodide in 10 ml. of toluene are slowly added with stirring at 30° C. Then, the mixture is heated to 60° C. for 2 hours. The salt (8.5 g.) is filtered off. The solvent and excess methyl iodide is distilled off in vacuo.

There remains 6.0 g. (58.8%) of bis(O,O-diethylphosphonylethylidene)-phosphinic ethyl ester as a viscous oil. The compound shows the following particularities in the NMR spectrum: ¹H CH₃CH₂ at 1.3δ (J_HH 7 Hz.) and PCHP at 0.96 to 1.83δ (broad, total H of CH₃ and CHCH₃=21.1, calc'd 20), POCH₂ at 4.12δ (J_HH 7 Hz., J_POCH 8 Hz., 10 H, calc'd 10 H).

Analysis.—Calc'd for C₁₄H₃₃O₈P₃ (422.33) (percent): C, 41.04; H, 8.07. Found (percent): C, 39.82; H, 7.88.

Similarly there are obtained by using allyl bromide bis-(O,O'-diethyl - phosphonylbutenylidene) - phosphinic ethylester, B.P. 160°/0.0001 mm.; n_D²⁰ 1.4725 and (O,O'-diethyl-phosphonylmethyl - O'',O''' - diethyl-phosphonylbutenylidene)-phosphinic ethylester: B.P. 158° C./0.0001 mm.: n_D²⁰ 1.4634.

What is claimed is:
1. A compound of the formula

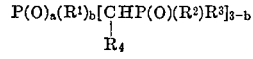

wherein all the groups R¹, R² and R³ are MO groups, R⁴ is a straight-chain alkyl group having 12 to 16 carbon atoms, M is an atom selected from the group consisting of sodium and potassium, *a* represents 0 or 1 and *b* represents 0 or 1.

References Cited

UNITED STATES PATENTS 3,299,123  1/1967  Fitch et al. _____ 260—932

OTHER REFERENCES

Canavan et al., "Jou. of Chem. Soc." (London) (1962), pp. 332–4.

CHARLES B. PARKER, Primary Examiner

A. H. SUTTO, Assistant Examiner

U.S. Cl. X.R.

44—DIG 4, 76; 252—DIG 17, 49.8, 77, 89, 389; 260—30.6, 290 HL, 346.1 R, 403, 429 J, 429.1, 430, 435 R, 438.1, 439 R, 465 G, 465.7, 502 R, 513 R, 583 E, 606.5 P, 968, 983.